(12) United States Patent
Izumi et al.

(10) Patent No.: US 11,487,188 B2
(45) Date of Patent: Nov. 1, 2022

(54) OPTICAL APPARATUS AND IMAGE PICKUP APPARATUS HAVING A MECHANISM THAT EXTENDS DISTAL END IN OPTICAL AXIS DIRECTION

(71) Applicant: CANON KABUSHIKI KAISHA, Tokyo (JP)

(72) Inventors: Mitsuhiro Izumi, Kanagawa (JP); Toshihiro Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 17/314,334

(22) Filed: May 7, 2021

(65) Prior Publication Data

US 2021/0349377 A1 Nov. 11, 2021

(30) Foreign Application Priority Data

May 11, 2020 (JP) .............................. JP2020-083401

(51) Int. Cl.
*G03B 17/14* (2021.01)
*G02B 7/04* (2021.01)
*G02B 7/02* (2021.01)

(52) U.S. Cl.
CPC ............. *G03B 17/14* (2013.01); *G02B 7/021* (2013.01); *G02B 7/023* (2013.01); *G02B 7/04* (2013.01)

(58) Field of Classification Search
CPC ...... G03B 17/14; G03B 17/02; G03B 17/565; G03B 17/04; G03B 2217/002; G03B 2205/0053; G02B 7/021; G02B 7/023; G02B 7/04; G02B 27/646; H04N 5/2254
See application file for complete search history.

(56) References Cited

U.S. PATENT DOCUMENTS

| 7,511,900 B2 * | 3/2009 | Imagawa | G02B 7/102 359/813 |
| 2004/0042090 A1 * | 3/2004 | Nomura | G02B 15/143 359/819 |
| 2006/0018654 A1 * | 1/2006 | Nuno | G02B 7/102 396/448 |
| 2008/0062539 A1 * | 3/2008 | Kato | G02B 7/16 359/813 |
| 2012/0002301 A1 * | 1/2012 | Nakajima | G02B 7/023 359/700 |

(Continued)

FOREIGN PATENT DOCUMENTS

JP 6197271 B2 9/2017

*Primary Examiner* — Chiawei Chen
(74) *Attorney, Agent, or Firm* — Cowan, Liebowitz & Latman, P.C.

(57) ABSTRACT

An optical apparatus and an image pickup apparatus capable of reducing an impact force transmitted to an inside without increasing a total length is provided. A frame member which moves forward and backward in the optical axis direction integrally with an extension lens barrel has a recess facing a protrusion of a cam barrel in a radial direction. An elastic member urges the extension lens barrel and the frame member to be away from each other in the optical axis direction. A restriction member holds the frame member with a first gap formed between the extension lens barrel and the frame member in the optical axis direction. A second gap formed between the protrusion and the recess in the optical axis direction is smaller than the first gap.

7 Claims, 13 Drawing Sheets

(56) References Cited

U.S. PATENT DOCUMENTS

| | | | |
|---|---|---|---|
| 2012/0063017 A1* | 3/2012 | Song | G02B 7/023 |
| | | | 359/822 |
| 2013/0195438 A1* | 8/2013 | Hase | G03B 3/00 |
| | | | 396/529 |
| 2014/0063296 A1* | 3/2014 | Ohya | G02B 7/102 |
| | | | 359/823 |
| 2015/0192756 A1* | 7/2015 | Uno | G03B 17/04 |
| | | | 359/696 |
| 2019/0187404 A1* | 6/2019 | Onaka | G03B 17/02 |

* cited by examiner

OPTICAL APPARATUS AND IMAGE PICKUP APPARATUS HAVING A MECHANISM THAT EXTENDS DISTAL END IN OPTICAL AXIS DIRECTION

BACKGROUND OF THE INVENTION

Field of the Invention

The present invention relates to an optical apparatus and an image pickup apparatus, and more particularly to an optical apparatus and an image pickup apparatus having a mechanism that extends a distal end in an optical axis direction.

Description of the Related Art

Some lens barrels of image pickup apparatuses such as a digital camera and a digital video camera have a configuration in which a cam groove installed in a cam barrel and a cam follower installed in a frontmost lens barrel engage with each other to move the frontmost lens barrel forward and backward in the optical axis direction by rotating the cam barrel. When an impact force is applied to the frontmost lens barrel, the impact force is transmitted to the cam follower and the cam groove to deform them, which may reduce an advance/retreat accuracy or make it impossible to advance/retreat.

For such problems, Japanese Patent No. 6197271 discloses a lens barrel including an optical member holding unit (lens barrel) that holds an optical member, a cushioning member installed toward an objective relative to the optical member holding unit, and a frame body installed on an objective side of the cushioning member and located closer to the objective than the optical member. In this lens barrel, the impact force acting on the frame body is absorbed by the cushioning member installed between the frame body and the optical member holding unit collapsing, and as a result, the impact force transmitted to the optical member holding unit can be reduced.

However, in the configuration disclosed in Japanese Patent No. 6197271, the impact force is prevented from being transmitted to an inside of the lens barrel by the cushioning member collapsing. Therefore, in order to enhance an effect of preventing the impact force, it is necessary to increase a size of the cushioning member. For example, when a coil spring is lengthened, there is a problem that a total length of the lens barrel is long.

SUMMARY OF THE INVENTION

The present invention provides an optical apparatus and an image pickup apparatus capable of reducing an impact force transmitted to an inside without increasing a total length.

Accordingly, the present invention provides an optical apparatus comprising an extension lens barrel that moves forward and backward in an optical axis direction, a cam follower provided in the extension lens barrel, a cam barrel that has a cam groove which engages with the cam follower and a protrusion which is provided so as to protrude in an outer circumferential side and is rotatable around an optical axis, a frame member that covers a distal end of the extension lens barrel and part of an outer circumference of the cam barrel and moves forward and backward in the optical axis direction integrally with the extension lens barrel, an elastic member that urges the extension lens barrel and the frame member to be away from each other in the optical axis direction, and a restriction member that holds the frame member with a first gap formed between the extension lens barrel and the frame member in the optical axis direction, wherein a recess facing the protrusion in a radial direction is provided at an inner circumference of the frame member, and a second gap formed between the protrusion and the recess in the optical axis direction is smaller than the first gap.

According to the present invention, it is possible to provide an optical apparatus capable of reducing the impact force transmitted to the inside without increasing the total length.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Here, an interchangeable lens (lens barrel) of a digital camera will be taken up as an optical apparatus according to the present invention. In the following explanation, as an embodiment of the present invention, a digital camera image pickup apparatus) including an interchangeable lens and a digital camera body configured so that an interchangeable lens can be attached and detached will be described.

Figure 1A:
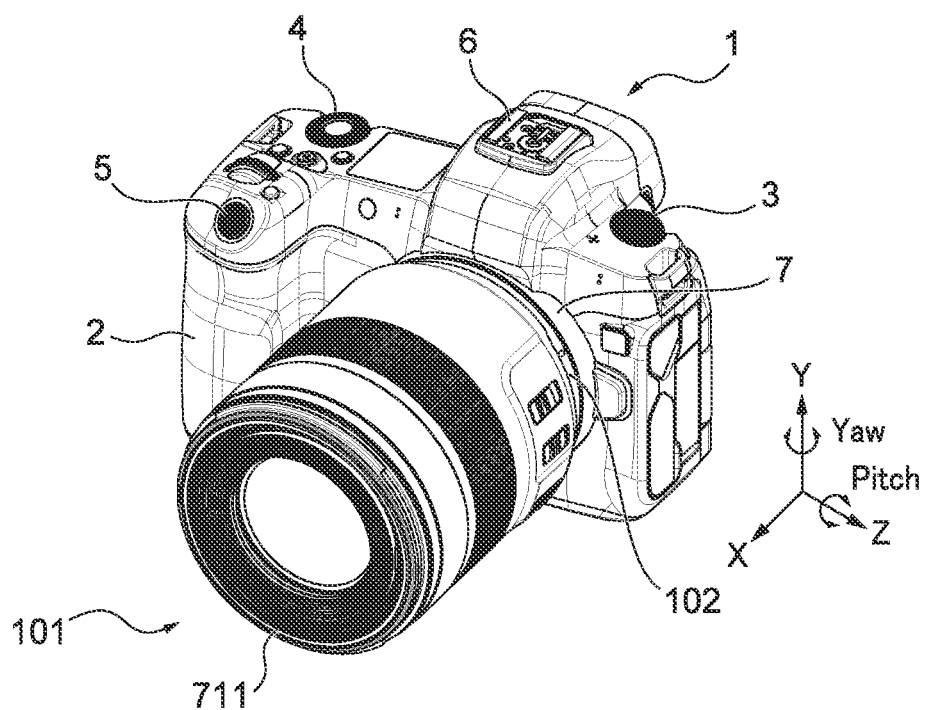
FIG. 1A and FIG. 1B are external perspective views of an image pickup apparatus according to an embodiment of the present invention.
Figure 1B:
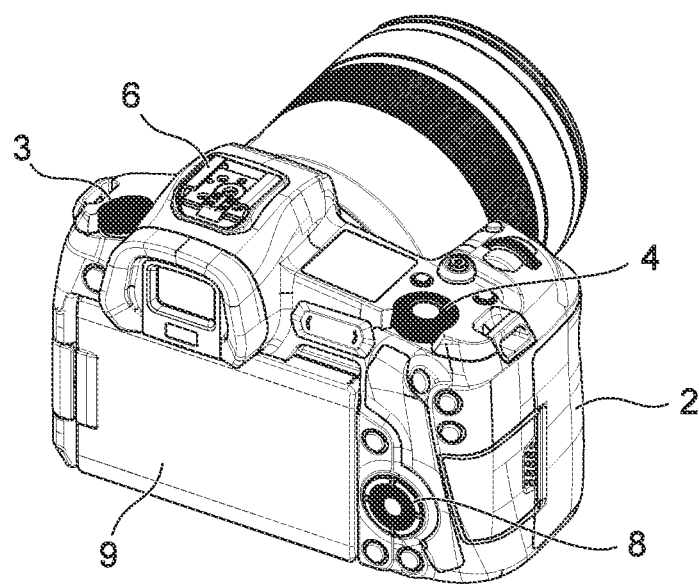

FIG. 1A is an external perspective view of the digital camera according to the embodiment of the present invention when viewed diagonally from a front. FIG. 1B is an external perspective view of the digital camera shown in FIG. 1A when viewed diagonally from a rear. The digital camera shown in FIG. 1 includes an interchangeable lens 101 and a digital camera body 1 (hereinafter referred to as "camera body 1") to which the interchangeable lens 101 can be attached and detached.

As shown in FIG. 1A, an X-axis, a Y-axis and a Z-axis that are orthogonal to each other are defined. A direction (optical axis direction) in which an optical axis of an image pickup optical system housed in the interchangeable lens 101 extends is defined as an X direction. When the X direction is parallel to a horizontal direction, a direction parallel to the horizontal direction and orthogonal to the X direction is defined as a Z direction, and a direction orthogonal to the X direction and the Z direction are defined as a Y direction. Further, it is assumed that the X direction is a front-rear direction of the camera body 1, the Z direction is a width direction of the camera body 1, and the Y direction is a height direction of the camera body 1. Further, a direction of rotation around the Z-axis is a pitch direction, and a rotation direction around the Y-axis is a yaw direction. It should be noted that in the following description, the Z direction and the Y direction may be collectively referred to as the Z/Y direction, and the pitch direction and the yaw direction may be collectively referred to as the pitch/yaw direction.

A grip portion 2 for a user to grip the camera body 1 by hand is provided on a left side (right side when viewed from a back side) when viewed from the front (subject side (not shown)) of the camera body 1. A power supply operation unit 3, a mode dial 4, a release button 5, and an accessory shoe 6 are provided on an upper face of the camera body 1. The power supply operation unit 3 is an operation unit for switching between an on state and an off state of a power supply of the camera body 1. The mode dial 4 is an operation unit for switching an image pickup mode. The image pickup mode, as an example, includes a manual still image pickup mode in which the user can arbitrarily set image pickup conditions such as a shutter speed and an aperture value, an automatic still image pickup mode in which an appropriate exposure amount is automatically obtained, and a moving image pickup mode for picking up a moving image, and the like.

When the release button 5 is pressed halfway, image pickup preparation operations such as autofocus and automatic exposure control are performed. Further, when the release button 5 is fully pressed, an image pickup operation is performed. Accessories such as an external strobe device can be attached to and detached from the accessory shoe 6. It should be noted that an image pickup device 16 (see FIGS. 2 to 4) that photoelectrically converts an optical image formed by light passing through the image pickup optical system of the interchangeable lens 101 to output an electrical signal (image pickup signal) is provided inside the camera body 1.

A rear operation unit 8 and a display unit 9 are provided on the rear face of the camera body 1. The rear operation unit 8 includes a plurality of buttons and dials to which various functions are assigned. When the power supply of camera body 1 is turned on, and the still image pickup mode or the moving image pickup mode is set, a through image of a subject image picked up by the image pickup device 16 disposed inside the camera body 1 is displayed on the display unit 9. In addition, the user displays image pickup parameters indicating the image pickup conditions such as the shutter speed and the aperture value on the display unit 9, and can change a set value of the image pickup parameters by operating the rear operation unit 8 while observing the display. The rear operation unit 8 includes a play button for instructing replay of a recorded pickup image. When the play button is operated, the pickup image is replayed and displayed on the display unit 9.

The interchangeable lens 101 is mechanically and electrically connected to the camera body 1 by coupling a camera mount 102 of the interchangeable lens 101 to a lens mount 7 provided on the camera body 1. The image pickup optical system that forms the subject image by forming the image of light from the subject on the image pickup device 16 is housed inside the interchangeable lens 101. A cylindrical filter frame 711 (frame member) is disposed at a front side distal end of the interchangeable lens 101. The filter frame 711 is an appearance component (a component appearing on an appearance) of the interchangeable lens 101, and the details thereof will be described below.

Figure 2:
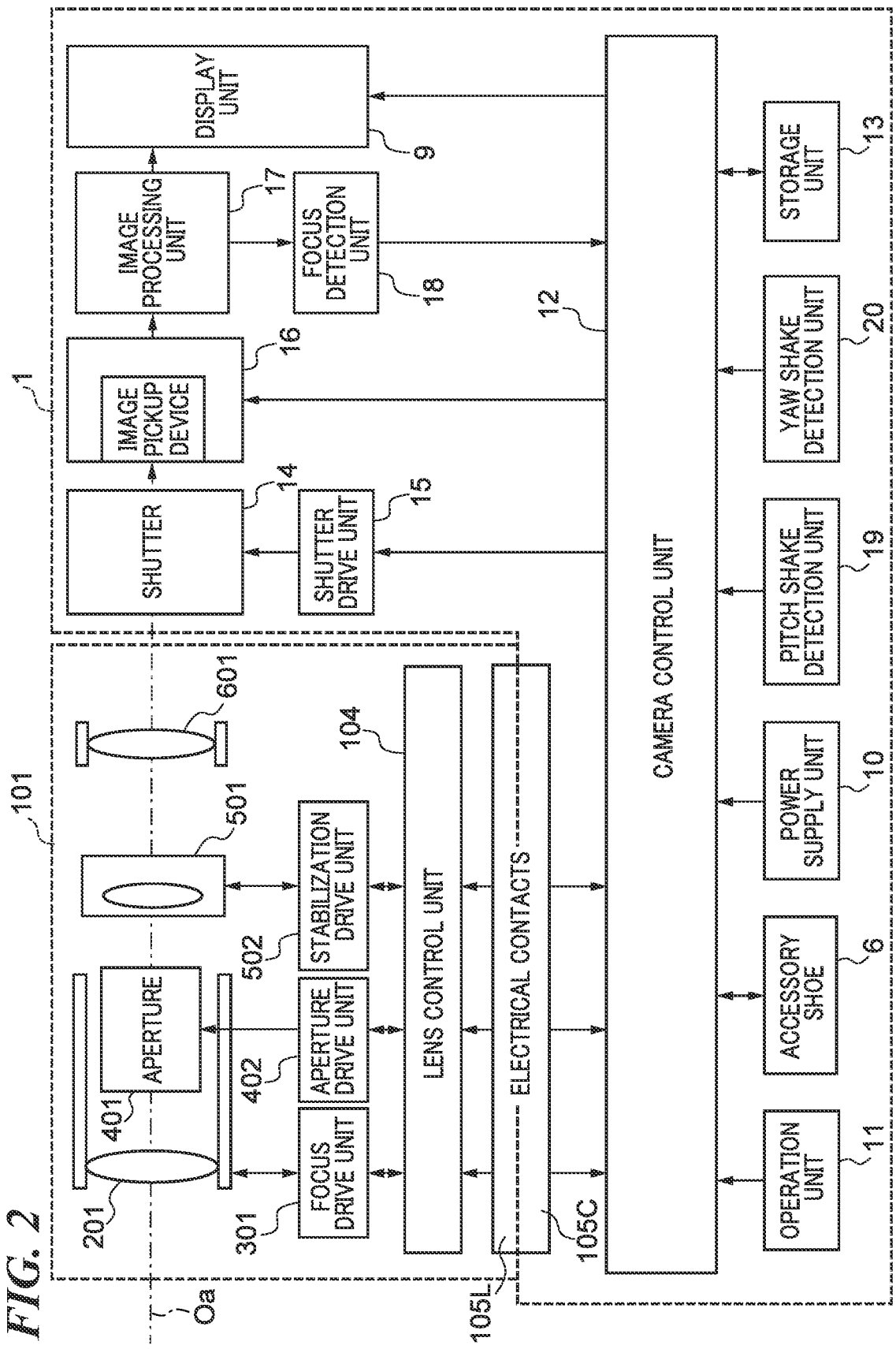
FIG. 2 is a block diagram of an image pickup apparatus according to the embodiment.

FIG. 2 is a block diagram showing electrical and optical configurations of the interchangeable lens 101 and the camera body 1. It should be noted that regarding blocks (components) shown in FIG. 2, the content already explained with reference to FIGS. 1A and 1B will not be described here.

The interchangeable lens 101 includes a focus group 201, a focus drive unit 301, an aperture group 401, an aperture drive unit 402, a stabilizing group 501, a stabilization drive unit 502, a fixed group 601, a lens control unit 104, and an electrical contact 105L. On the other hand, the camera body 1 includes the accessory shoe 6, a camera control unit 12, a shutter unit 14, a shutter drive unit 15, the image pickup device 16, an image processing unit 17, a focus detection unit 18, the display unit 9, and a power supply unit 10. Further, the camera body 1 includes an operation unit 11, a pitch shake detection unit 19, a yaw shake detection unit 20, a storage unit 13, and an electrical contact 105C.

The focus group 201, the aperture group 401, the stabilizing group 501, and the fixed group 601 constitute the image pickup optical system of the interchangeable lens 101. The focus group 201 includes a focus lens (a first focus lens 211 and a second focus lens 212 (see FIGS. 3 and 4)) that move in the optical axis direction to adjust a focus. The focus drive unit 301 moves the focus lens in the optical axis direction. The aperture group 401 adjusts the amount of light incident on the image pickup device 16. The aperture drive unit 402 drives the aperture group 401. The stabilizing group 501 includes a shift lens as a stabilizing element for reducing image shake. The stabilization drive unit 502 performs a stabilizing operation to reduce image shake by moving the shift lens in a plane (Z/Y-axis direction) orthogonal to the optical axis.

When the interchangeable lens 101 is attached to the camera body 1, the electrical contact 105L and the electrical contact 105C are connected, and various control signals, data, and the like can be communicated between the camera control unit 12 and the lens control unit 104 via the electrical contacts 105L and 105C. When the interchangeable lens 101 is attached to the camera body 1, the lens control unit 104 transmits information of the interchangeable lens 101 to the camera control unit 12. The lens control unit 104 controls operations of the focus drive unit 301, the aperture drive unit 402, and the stabilization drive unit 502 based on an instruction from the camera control unit 12 to transmit a control result to the camera control unit 12. It should be noted that the electrical contacts 105L and 105C include a power supply terminal that supplies electric power from the power supply unit 10 of the camera body 1 to the interchangeable lens 101.

The operation unit 11 of the camera body 1 includes the power supply operation unit 3, the mode dial 4, the release button 5, and the rear operation unit 8 described above, and further includes a touch panel provided on the display unit 9. The power supply unit 10 is a battery or the like that supplies electric power to the camera body 1 and the interchangeable lens 101. The shutter unit 14 adjusts an amount of exposure to the image pickup device 16. The shutter drive unit 15 drives the shutter unit 14. The image pickup signal output from the image pickup device 16 is input to the image processing unit 17. The image processing unit 17 performs various image processing on the image pickup signal to generate an image signal (image data). The image signal output from the image processing unit 17 is displayed on the display unit 9 as a through image.

The storage unit 13 stores a computer program executed by the camera control unit 12, various parameters, and the like. The camera control unit 12 performs overall control of the camera body 1 by reading and executing a computer program stored in the storage unit 13. Further, as described above, the camera control unit 12 controls the operation of the interchangeable lens 101 through the lens control unit 104.

The camera control unit 12 controls drive of the focus group 201 in response to a half-press operation of the release button 5. For example, when an autofocus operation is instructed, the focus detection unit 18 determines a focus state of the subject image imaged on the image pickup device 16 based on the image signal generated by the image processing unit 17, and generates a focus signal to transmit it to the camera control unit 12. On the other hand, the lens control unit 104 detects a current position of the focus group 201 via the focus drive unit 301 to transmit a detection signal to the camera control unit 12. The camera control unit 12 compares the focus state of the subject image with the current position of the focus group 201 to obtain an amount of deviation, calculates a focus drive amount from the obtained amount of deviation to transmit the focus drive amount to the lens control unit 104. The lens control unit 104 drives the focus drive unit 301 with the focus drive amount acquired from the camera control unit 12, and moves the focus group 201 to a target position. As a result, defocus of the subject image is corrected.

It should be noted that the focus drive unit 301 that drives the focus group 201 includes a cam barrel, a focus motor, a reduction gear that connects the cam barrel and the focus motor, and a photo interrupter that detects an origin position of the focus group 201. Generally, as the focus motor, a stepping motor, which is a kind of actuator, is often adopted. However, when the stepping motor is used, only a relative drive amount can be controlled, so that the current position of the focus group 201 is indefinite when the power is off. Therefore, when the user turns on the power of the camera body 1, it is necessary to perform control to move the focus group 201 to the origin position and execute an origin position detection process. Since the control of such an origin position detection process is a known technique that has been adopted in many optical apparatuses, the description thereof is omitted here. It should be noted that as the actuator, a DC motor or an ultrasonic motor provided with an encoder may be adopted. Further, the photo interrupter directly receives light emitted from a light emitting unit at a light receiving unit, but instead of this, a photo reflector that receives reflected light from a reflecting surface, or a brush that comes into contact with a conductive pattern may be used.

The camera control unit 12 controls the drive of the aperture group 401 and the shutter unit 14 through the aperture drive unit 402 and the shutter drive unit 15 according to values of the aperture value and the shutter speed set through the operation unit 11. For example, when the operation of the automatic exposure control is instructed, the camera control unit 12 acquires a luminance signal generated by the image processing unit 17 and performs photometric calculation. The camera control unit 12 drives the aperture group 401 based on a photometric calculation result according to a full press operation (image pickup instruction) of the release button 5, and drives the shutter unit 14 to perform exposure processing by the image pickup device 16.

The pitch shake detection unit 19 detects image shake in the pitch direction using an angular velocity sensor (vibrating gyro) or an angular acceleration sensor to output a shake signal. Further, the yaw shake detection unit 20 detects the image shake in the yaw direction by using an angular velocity sensor or an angular acceleration sensor to output a shake signal. The camera control unit 12 calculates a shift position (target position) of the stabilizing group 501 (shift lens) in the Y-axis direction from the shake signal from the pitch shake detection unit 19, and calculates a shift position of the stabilizing group 501 in the Z-axis direction from the shake signal from the yaw shake detection unit 20. Then, the camera control unit 12 reduces the image shake during exposure or through image display by moving the stabilizing group 501 to each shift position in the calculated pitch/yaw directions.

Figure 3:
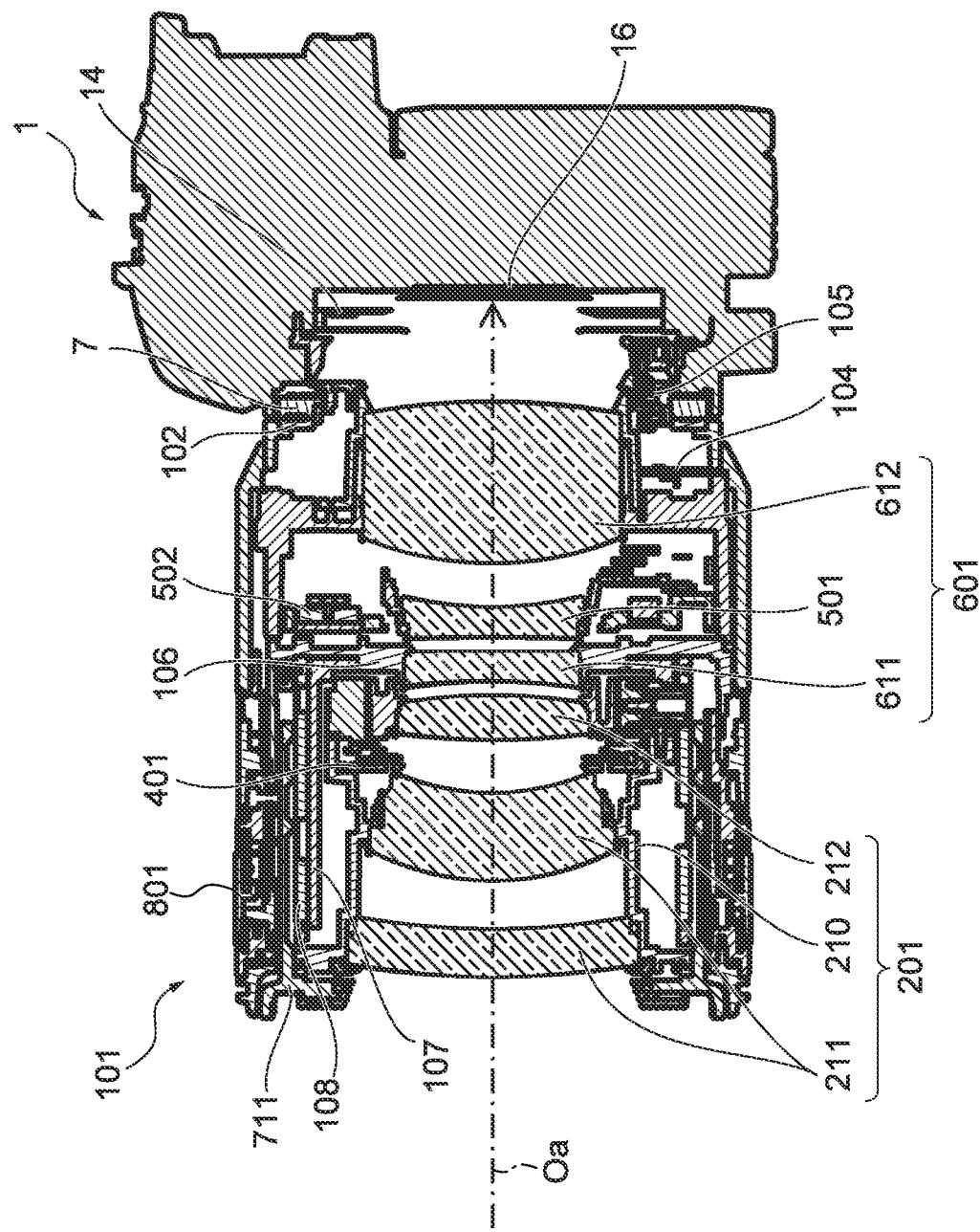
FIG. 3 is a first cross-sectional view of the image pickup apparatus according to the embodiment.
Figure 4:
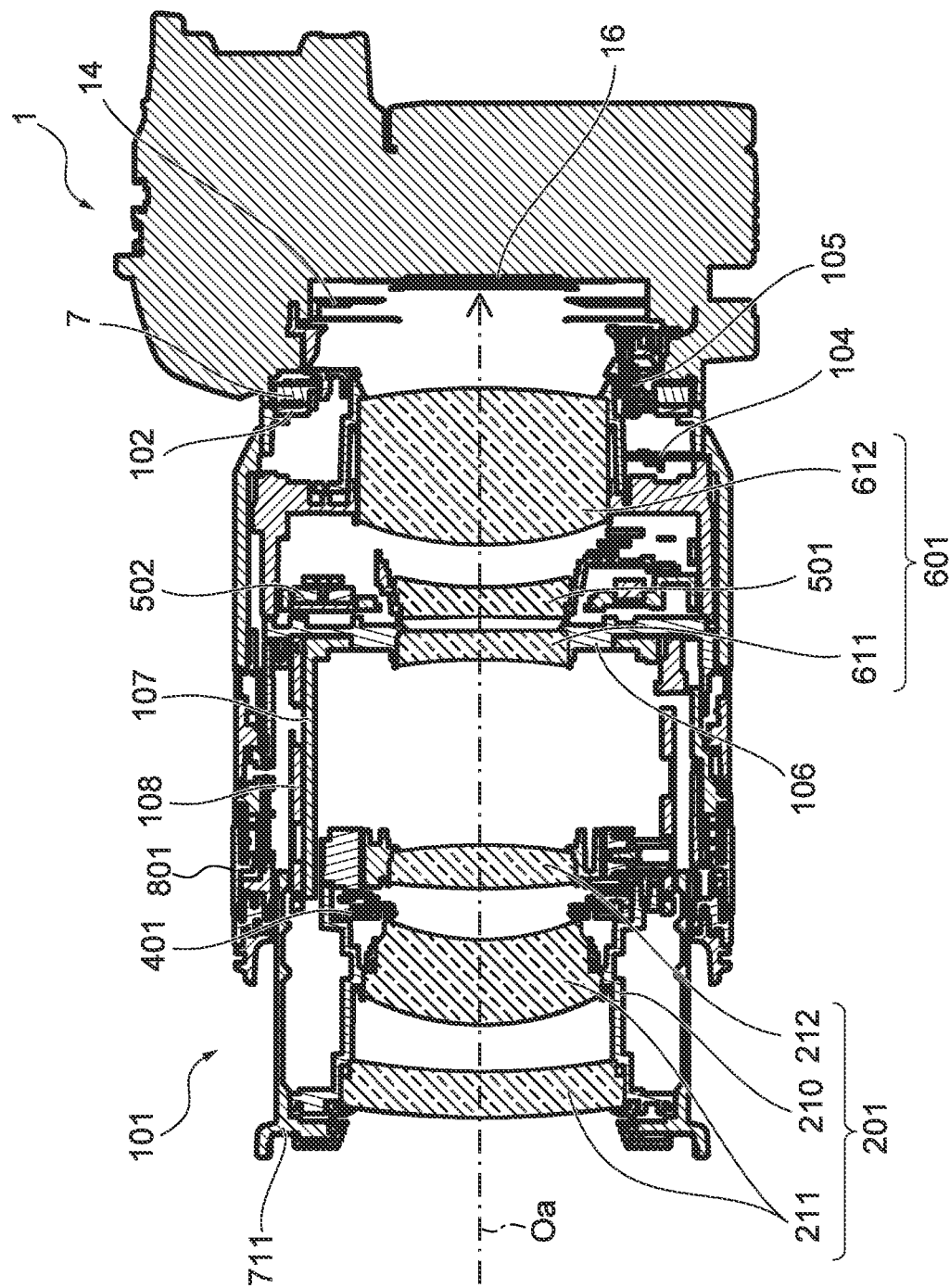
FIG. 4 is a second cross-sectional view of the image pickup apparatus according to the embodiment.

Next, a positional relationship of each component of the interchangeable lens 101 and the camera body 1 will be described. FIGS. 3 and 4 are cross-sectional views of the interchangeable lens 101 and the camera body 1 in the XY plane including the optical axis Oa of the image pickup optical system, FIG. 3 shows a retraction state of the focus group 201, and FIG. 4 shows an extension state of the focus group 201.

An exterior unit 801 (exterior member) is disposed outside the shooting optical system of the interchangeable lens 101. The image pickup optical system of the interchangeable lens 101 has a two-group configuration consisting of the focus group 201 and the fixed group 601. The focus group 201 includes a lens barrel having a cylindrical shape (hereinafter referred to as a "distal end lens barrel 210") and the first focus lens 211 held by the distal end lens barrel 210. Further, the focus group 201 includes a moving barrel 221 (see FIG. 6) and the second focus lens 212 held by the moving barrel 221.

The fixed group 601 includes a first fixed lens 611 and a second fixed lens 612. The focus group 201, which has moved to a predetermined optical position according to the defocus of the subject image, forms an image of light from the subject on an image pickup plane of the image pickup device 16 via the fixed group 601.

The aperture group 401 is housed in the focus group 201 together with the first focus lens 211 and the second focus lens 212, thereby moving integrally with the focus group 201 in the optical axis direction. Further, the filter frame 711 having a cylindrical shape is configured to have the appearance to cover an outside of the entire focus group 201, and is disposed so as to cover the front (subject side) of the distal end lens barrel 210 to move in the optical axis direction integrally with the focus group 201. On the other hand, the stabilizing group 501 is disposed between the first fixed lens 611 and the second fixed lens 612 in the optical axis direction to form part of the fixed group 601, and, therefore, the position of the interchangeable lens 101 in the optical axis direction is fixed.

The image pickup optical system of the interchangeable lens 101 has an adjustment mechanism for intentionally shilling the position of the second focus lens 212 for the purpose of maintaining an optical performance of the entire image pickup optical system. As a result, in an assembly process of the interchangeable lens 101, an operator can cancel out manufacturing errors, assembly variations, and the like that occur in each component while checking the state of the overall optical performance.

Figure 5A:
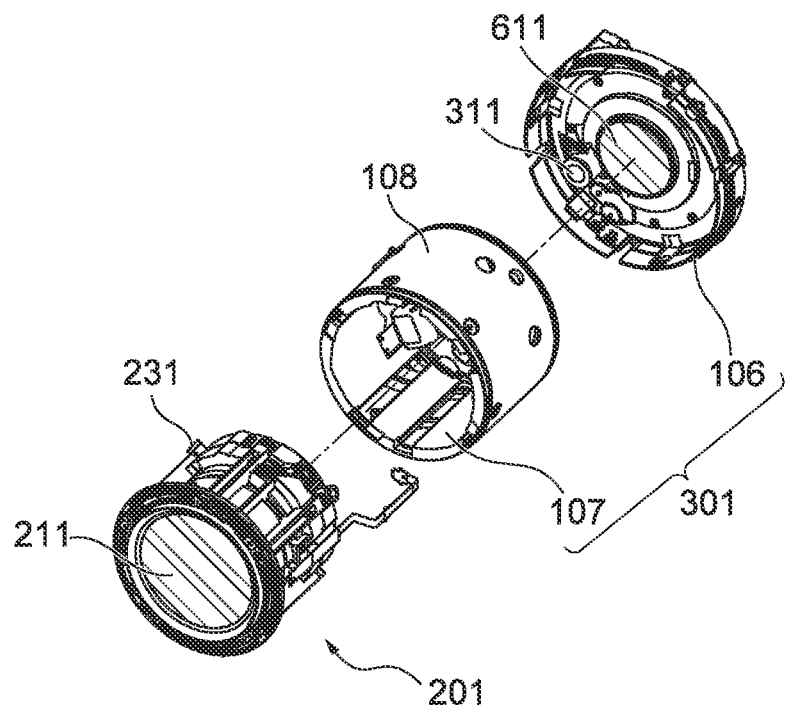
FIG. 5A and FIG. 5B are partially exploded perspective views of interchangeable lenses constituting the image pickup apparatus according to the embodiment.
Figure 5B:
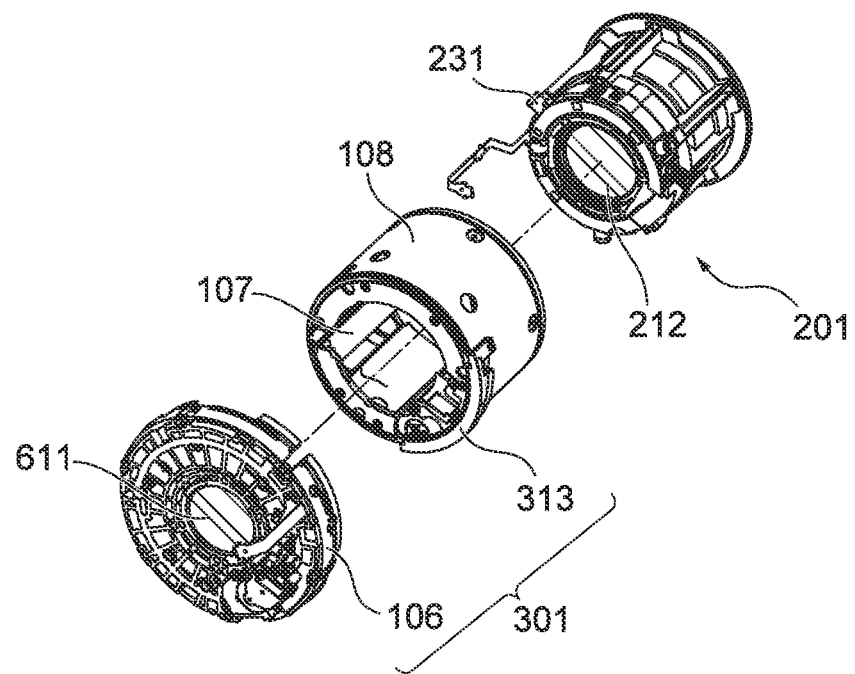
Figure 6:
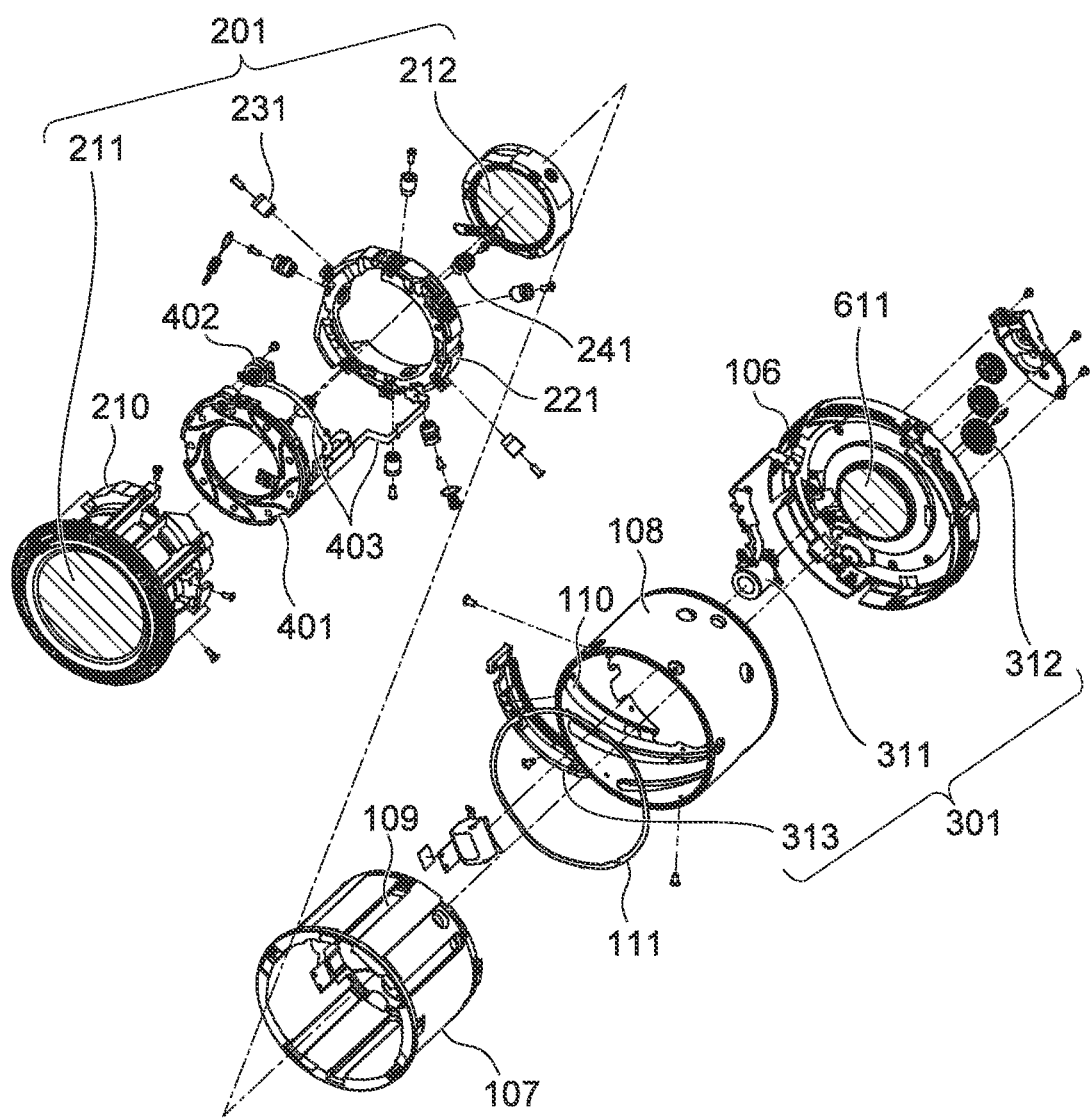
FIG. 6 is a perspective view showing the state of FIG. 5A in a further disassembled manner.

Next, a focus drive mechanism will be described in detail. FIGS. 5A and 5B are perspective views showing the focus group 201 and the focus drive unit 301 in an exploded manner, FIG. 5A shows a state viewed from diagonally front, and FIG. 5B shows a state viewed from diagonally behind. FIG. 6 is a perspective view showing a state in which the focus group 201 and the focus drive unit 301 are viewed from diagonally front by disassembling part of the component parts more finely than in FIG. 5A.

The focus drive unit 301 includes a fixed barrel 106, a straight guide barrel 107, and a cam barrel 108. The first fixed lens 611, which is one of the components of the fixed group 601, is held at an inner circumference of the fixed barrel 106. The straight guide barrel 107 is fixed to a subject side face of the fixed barrel 106. The focus group 201 is housed in an inner circumference of the straight guide barrel 107. An outer circumference of the straight guide barrel 107 holds the cam barrel 108 rotatably. The cam barrel 108 is urged in the optical axis direction by a leaf spring 111, and a camera body side face of the cam barrel 108 is slidably close contact with the fixed barrel 106.

A focus motor 311 is fixed to a front face of the fixed barrel 106 so that its rotation shaft is parallel to the optical axis. Further, a reduction gear 312 composed of a plurality of gears is rotatably held on a rear face of the fixed barrel 106. A cam barrel gear 313 connected to the reduction gear 312 is fixed to an outer circumferential face of the cam barrel 108. When the focus motor 311 is rotationally driven, the driving force is decelerated via the reduction gear 312 and the cam barrel gear 313 and transmitted to the cam barrel 108. In this way, the cam barrel 108 rotates about the optical axis Oa in a state where the movement in the optical axis direction is restricted.

As described above, the focus group 201 includes the moving barrel 221. The second focus lens 212 is housed in an inner circumference of the moving barrel 221 via an adjustment roller 241. The moving barrel 221 is connected to the distal end lens barrel 210 holding the first focus lens 211 in the optical axis direction, thereby forming one extension lens barrel. A movement roller 231 (cam follower) is fixed to an outer circumferential face of the moving barrel 221 in a direction orthogonal to the optical axis with a screw.

The focus group 201 is inserted and incorporated from a front of the straight guide barrel 107 into the inner circumference of the straight guide barrel 107. The straight guide barrel 107 has a straight guide groove 109 that restricts rotational movement of the focus group 201 around the optical axis Oa and guides the straight movement in the optical axis direction. Further, the cam barrel 108 has a cam groove 110 having a linear locus in a rotation direction centered on the optical axis Oa corresponding to a stroke of the focus group 201. Further, the movement roller 231 of the focus group 201 is engaged with the straight guide groove 109 of the straight guide barrel 107 and the cam groove 110 of the cam barrel 108. Therefore, when the cam barrel 108 is rotated, the movement roller 231 can move the focus group 201 forward and backward in the optical axis direction according to the engagement between the straight guide groove 109 and the cam groove 110.

The aperture drive unit 402 is electrically connected to the aperture group 401 via a flexible printed wiring board 403. The flexible printed wiring board 403 is configured to be bendable between an inner circumferential face of the straight guide barrel 107 and the outer circumferential face of the moving barrel 221, and the aperture group 401 moves integrally with the moving barrel 221.

Figure 7:
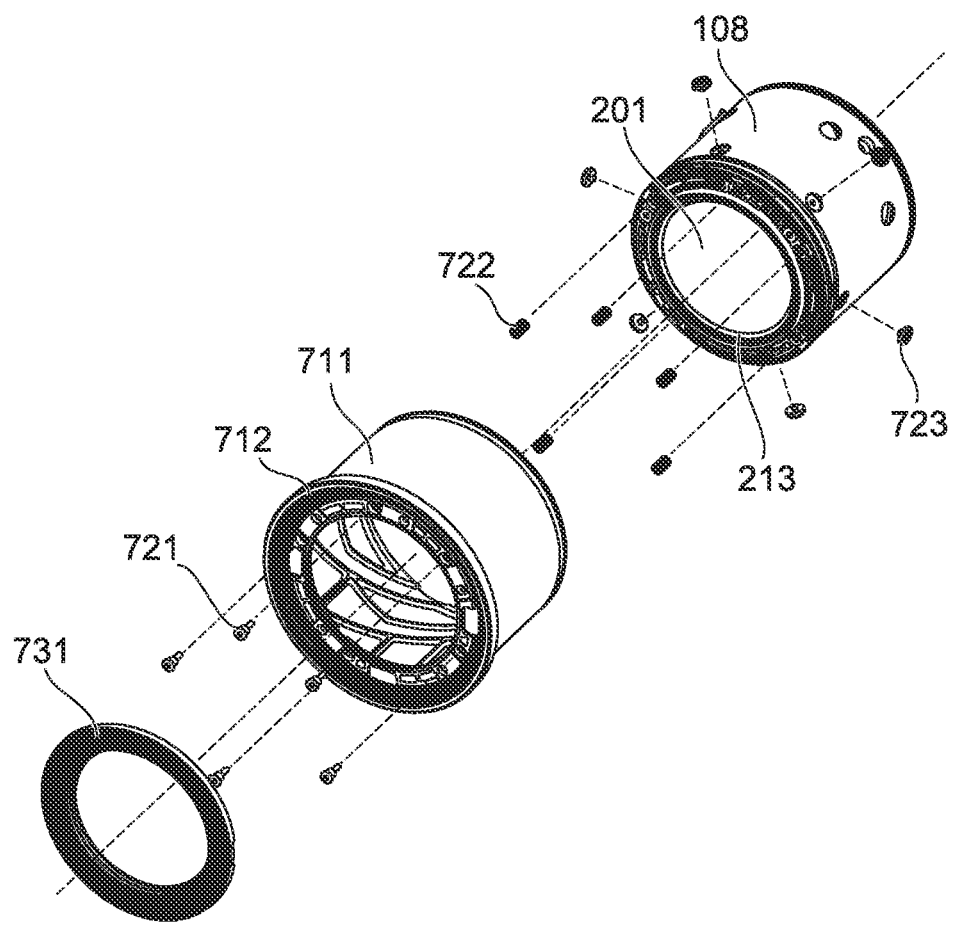
FIG. 7 is an exploded perspective view of a focus group and a filter frame of the interchangeable lens constituting the image pickup apparatus according to the embodiment.
Figure 8A:
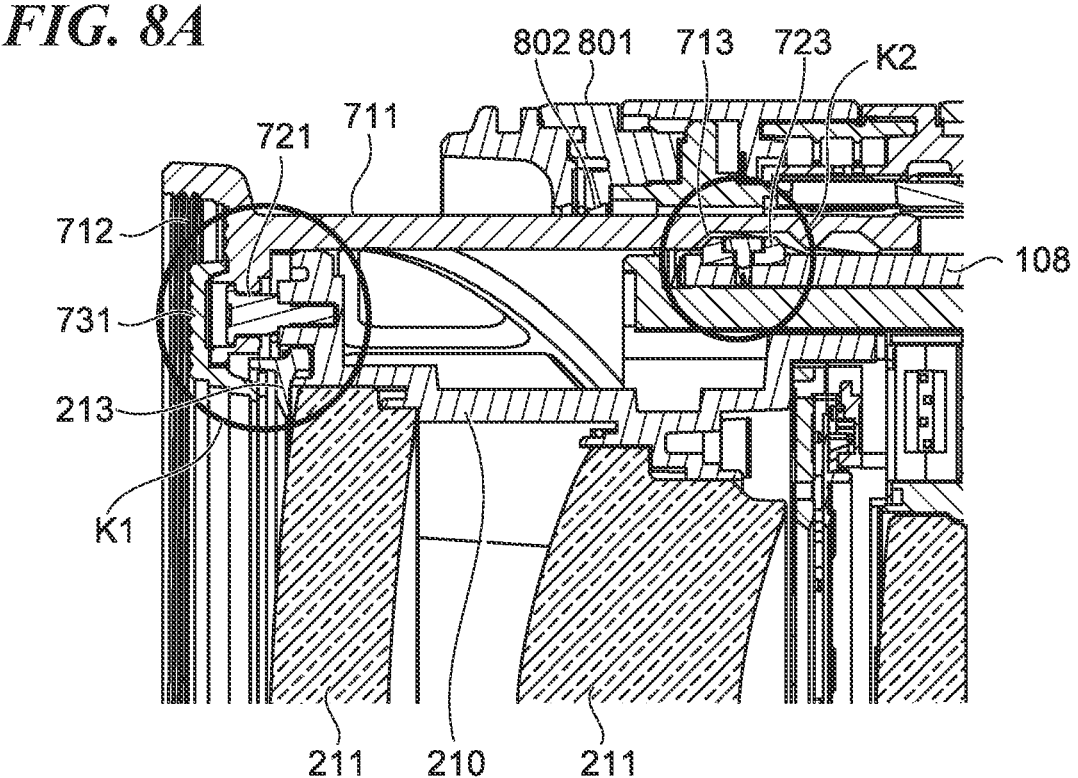
FIGS. 8A to 8C are a partial cross-sectional view and partially enlarged views of the filter frame and the focus group shown in FIG. 7.
Figure 8B:
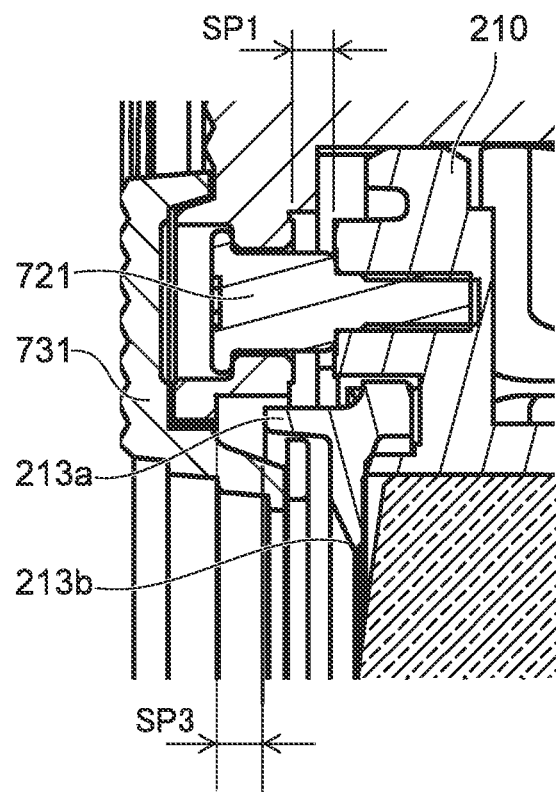
Figure 8C:
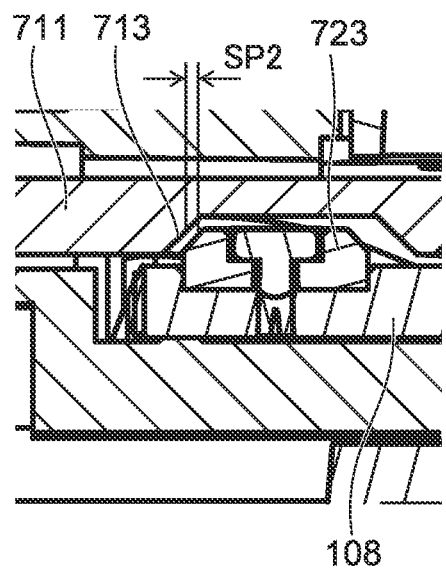

Next, a peripheral configuration of the filter frame 711 will be described. FIG. 7 is an exploded perspective view of the focus group 201 and the filter frame 711. FIG. 8A is a partial cross-sectional view of the filter frame 711 and the focus group 201, and is represented by an XY cross section including the optical axis Oa. FIG. 8B is an enlarged view of region K1 in FIG. 8A. FIG. 8C is an enlarged view of region K2 in FIG. 8A.

The filter frame 711 located at the distal end of the interchangeable lens 101 is attached to the distal end lens barrel 210 using a stepped screw 721 so as to cover the distal end of the distal end lens barrel 210, and moves in the optical axis direction integrally with the focus group 201 according to the control of the focus drive unit 301. A coil spring 722 is disposed between the filter frame 711 and the distal end lens barrel 210. Under a normal condition, the filter frame 711 and the distal end lens barrel 210 (the focus group 201) are away by the coil spring 722 with a first gap SP1 in the optical axis direction. The first gap SP1 is maintained at a constant width by restricting the movement of the filter frame 711 at a stepped portion of the stepped screw 721.

It should be noted that in the present embodiment, although the stepped screw 721 is used as a restriction member that restricts the movement of the filter frame 711, the present invention is not limited to this as long as the position of the filter frame 711 can be restricted in the optical axis direction. For example, a structure such as bayonet coupling of two parts may be used. Further, the coil spring 722 that makes the filter frame 711 and the distal end lens barrel 210 away in the optical axis direction is an example of a usable elastic member, and the present invention is not limited to this. Parts made of elastic materials such as rubber and elastomer may be used.

Figure 9:
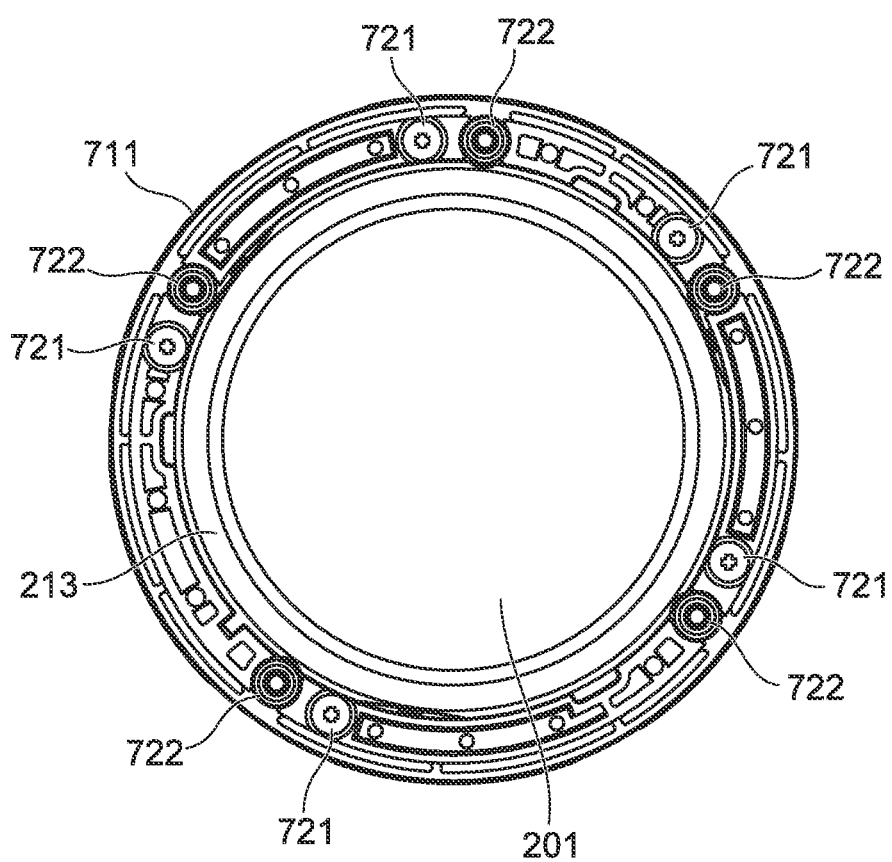
FIG. 9 is a front view showing an arrangement of a stepped screw and a coil spring intervening in the focus group and the filter frame in the interchangeable lens of FIG. 7.

FIG. 9 is a front view (viewed from the optical axis direction) showing an arrangement of the stepped screw 721 and the coil spring 722. When viewed from the optical axis direction, the stepped screws 721 and the coil springs 722 are disposed alternately on a circumference having substantially the same radius in a circumferential direction so as not to overlap each other. This makes it possible to efficiently arrange the components in the circumferential direction without increasing the size of the interchangeable lens 101 in a radial direction. Further, a reaction force of the coil spring 722 acting on each of the plurality of stepped screws 721 can be equalized.

Figure 10A:
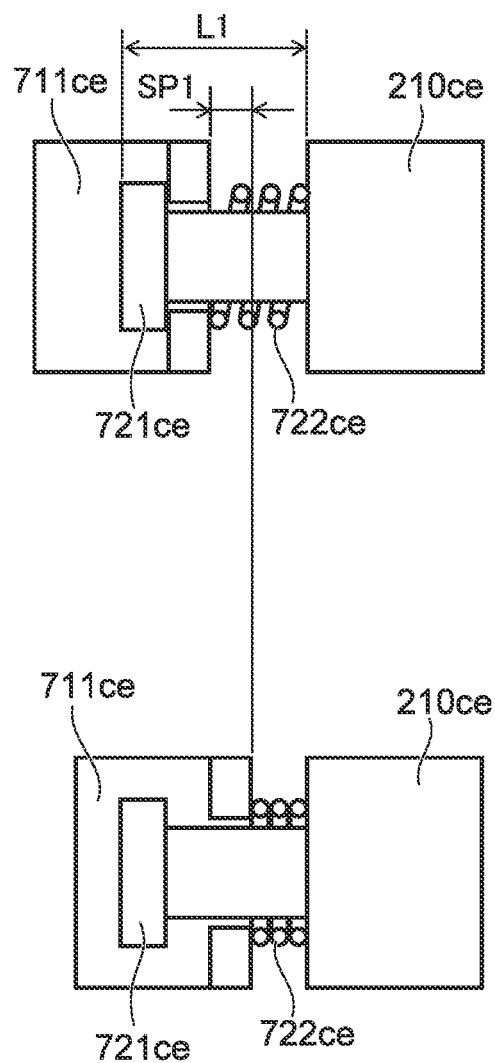
FIG. 10A and FIG. 10B are diagrams showing a relationship between the arrangement of the stepped screw and the coil spring intervening in the focus group and the filter frame, and a length of the interchangeable lens in an optical axis direction in comparison with a reference example and the embodiment.
Figure 10B:
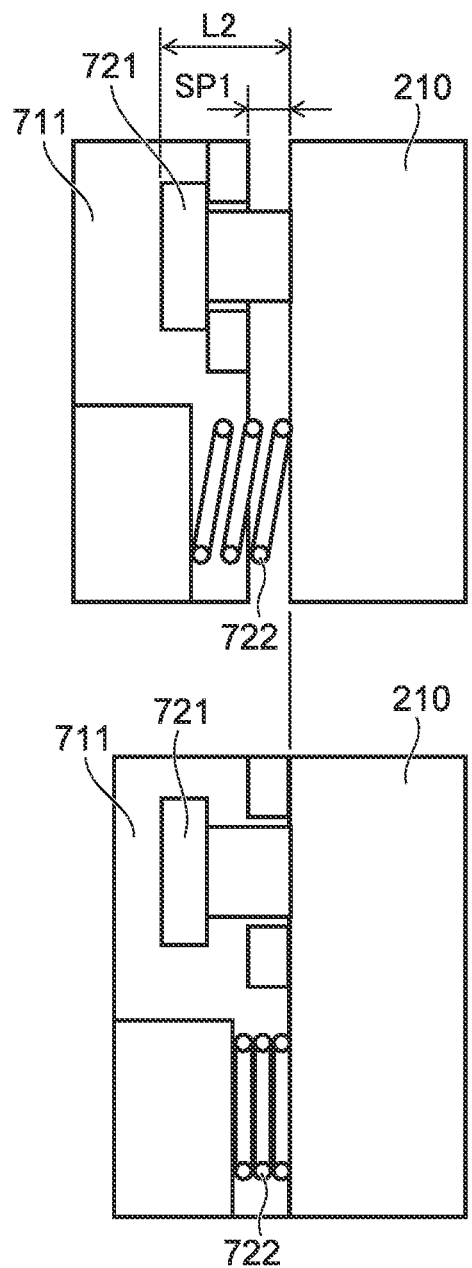

FIGS. 10A and 10B are diagrams showing a relationship between the arrangement of the stepped screw 721 and the coil spring 722 and a length of the interchangeable lens 101 in the optical axis direction. FIG. 10A is a diagram showing a reference example in which the stepped screw 721 and the coil spring 722 are disposed so as to overlap each other when viewed from the optical axis direction. An upper figure of FIG. 10A schematically shows a state where the first gap SP1 is formed, and a lower figure of FIG. 10A schematically shows a state where the first gap SP1 collapses (the filter frame 711 is pressed against the distal end lens barrel 210).

On the other hand. FIG. 10B is a diagram showing the present embodiment (example) in which the stepped screw 721 and the coil spring 722 are disposed so as not to overlap when viewed from the optical axis direction. An upper figure of FIG. 10B schematically shows the state where the first gap SP1 is formed, and a lower figure of FIG. 10B schematically shows the state where the first gap SP1 collapses. It should be noted that since FIG. 10A shows a reference example, each component in FIG. 10A is distinguished by adding 'ce' to an end of a reference sign of each component in FIG. 10B.

In the reference example, a length from a contact face of the coil spring 722ce with the distal end lens barrel 210ce to the stepped screw 721ce is defined as L1. Similarly, a length from a contact face of the coil spring 722 with the distal end lens barrel 210 to the stepped screw 721 in the present embodiment is defined as L2. In this case, the relationship is L1>L2, as shown in FIGS. 10A and 10B. In other words, the length from the contact face between the coil spring and the distal end lens barrel to the stepped screw in the embodiment can be made shorter than that in the reference example. As a result, it can be seen that the overall length of the interchangeable lens 101 can be made short.

This is due to the following reasons. That is, both the coil springs 722 and 722ce have a finite length in the optical axis direction (horizontal direction in FIGS. 10A and 10B) in a compressed state as shown in the lower figures of FIGS. 10A and 10B. In the reference example, when the coil spring 722ce is extended so that the first gap SP1 is formed from the state shown in the lower part of FIG. 10A, positions of the coil spring 722ce and the filter frame 711ce do not overlap in the optical axis direction. On the other hand, in the embodiment, when the coil spring 722 is extended so that the first gap SP1 is formed from the state shown in the lower figure in FIG. 10B, it is possible to form a state in which the positions of the coil spring 722 and part of the filter frame 711 overlap in the optical axis direction. As a result, in the embodiment, the total length of the interchangeable lens 101 can be made short.

Return to the description with reference to FIGS. 8A to 8C. A recess 713 that serves as a friction wall is provided at an inner circumference of the filter frame 711. As shown in FIGS. 8A and 8C, a portion of the recess 713 on a distal end side of the interchangeable lens 101 is inclined so that the inclined portion is not orthogonal to the optical axis Oa on a cross section including the optical axis Oa, and an inner circumference part of the portion of the recess 713 is closer to the distal end of the interchangeable lens 101 than an outer circumference part of the portion of the recess 713. As a result, when the filter frame 711 is made of resin, it can be easily manufactured by using a method such as an inner diameter slide.

A protrusion 723 protruding in an outer circumference is provided at an outer circumference of the cam barrel 108 so as to face the recess 713 provided at the inner circumference of the filter frame 711. The protrusion 723 is made of a highly rigid material such as brass or stainless steel, and is screwed to the cam barrel 108. The material and fastening method of the protrusion 723 are not limited to this, and can be changed as long as effects to be described below can be obtained.

A substantially constant gap is maintained between the recess 713 provided at the inner circumference of the filter frame 711 and the protrusion 723 in the optical axis direction in an entire region where the filter frame 711 can move forward and backward when the cam barrel 108 rotates and the filter frame 711 together with the focus group 201 moves forward and backward in the optical axis direction. In other words, the recess 713 is formed in a groove shape so that the recess 713 and the protrusion 723 do not come into contact with each other in the entire region of moving forward and backward even when the cam barrel 108 is rotated and the filter frame 711 moves forward and backward in the optical axis direction to adjust the focus. In this way, the gap formed between the recess 713 and the protrusion 723 in the optical axis direction is referred to as a second gap SP2 as shown in FIG. 8C.

The second gap SP2 is set smaller (narrower) than the first gap SP1. The exterior unit 801 disposed at the outer circumference of the filter frame 711 has a restriction wall 802 having a minute gap with the filter frame 711. It should be noted that an effect obtained by providing the second gap SP2 and the restriction wall 802 will be described below.

Next, a behavior of the interchangeable lens 101 when the interchangeable lens 101 according to the present embodiment receives an external force such as an impact from an outside will be described. The filter frame 711 is located at a front side leading edge of the interchangeable lens 101 in both the retraction state and the extension state. For this reason, when the interchangeable lens 101 alone or the camera body 1 to which the interchangeable lens 101 is attached is dropped, the filter frame 711 may receive an impact force in the direction of being pushed toward the camera mount 102.

This impact force acts in a direction in which the filter frame 711 approaches the distal end lens barrel 210 (the focus group 201), so that the coil spring 722 disposed between the filter frame 711 and the distal end lens barrel 210 will be compressed. That is, the coil spring 722 is compressed and an energy of the impact force is absorbed, so that the impact force acting on the distal end lens barrel 210 can be reduced. When a compressed length of the coil spring 722 when receiving an impact force is smaller than the second gap SP2, the impact force is absorbed by the coil spring 722, so that the protrusion 723 and the recess 713 do not come into contact with each other.

Since the protrusion 723 and the recess 713 overlap when viewed from the optical axis direction, when an impact force that compresses the coil spring 722 more than the second gap SP2 is applied, the recess 713 and the protrusion 723 come into contact with each other after the coil spring 722 is compressed by the second gap SP2. That is, the impact force applied to the filter frame 711 is transmitted to the protrusion 723 (the cam barrel 108) through the recess 713 before being transmitted to the focus group 201 (the distal end lens barrel 210).

Figure 11A:
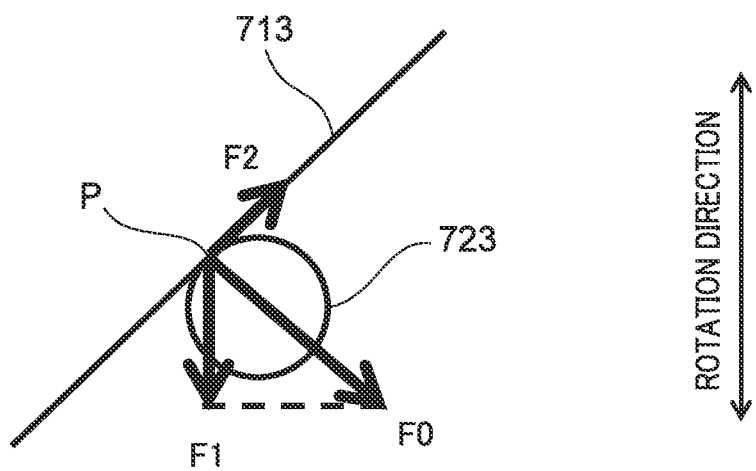
FIG. 11A and FIG. 11B are diagrams showing transmission of an impact force applied to the filter frame to a cam barrel.
Figure 11B:
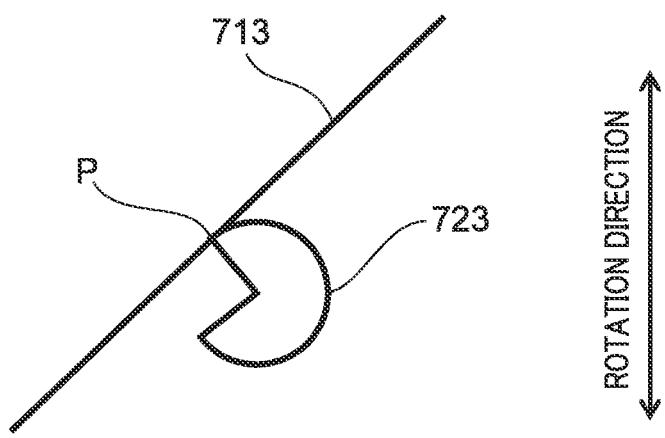

A force acting between the recess 713 and the protrusion 723 in a state where the recess 713 comes in contact with the protrusion 723 will be described with reference to FIGS. 11A and 11B. FIGS. 11A and 11B are diagrams showing transmission of the impact force applied to the filter frame 711 to the cam barrel 108, and FIG. 11A schematically shows a state in which the recess 713 and the protrusion 723 come in contact with each other. The recess 713 transmits the impact force received by the filter frame 711 to the protrusion 723. At this time, it is assumed that a force F0 is generated in a perpendicular direction of the recess 713 at a contact portion P between the recess 713 and the protrusion 723. A force F1, which is a component force of the force F0, acts as a force that rotates the cam barrel 108. On the other hand, at the contact portion P, a frictional force $F2=(\mu \times F0)$ with a friction coefficient as n is generated. This frictional force F2 acts in a direction opposite to the force F1 that rotates the cam barrel 108. That is, the frictional force F2 acts as a force for suppressing the rotation of the cam barrel 108.

In this way, it can be seen that when the recess 713 and the protrusion 723 come into contact. While the force F1 hat rotates the cam barrel 108 is generated, the frictional force F2 that suppresses the rotation of the cam barrel 108 is also generated, and a balance of these forces is governed by the friction coefficient μ. For example, when the friction coefficient μ is increased, the frictional force F2 is increased, and as a result, the rotation of the cam barrel 108 can be suppressed. On the other hand, when the friction coefficient μ is small, the force F1 is large, so that the cam barrel 108 tends to rotate easily. When the cam barrel 108 is rotated by the impact force (force F1), the force is transmitted so that the cam barrel gear 313 fixed to the cam barrel 108 rotates the reduction gear 312. As a result, there is a high possibility that the cam barrel gear 313 and the reduction gear 312 will be damaged.

Therefore, it is desirable that the recess 713 and the protrusion 723 be designed so that the frictional force F2 generated between the recess 713 and the protrusion 723 is large, and the force F1 acting in the direction in which the cam barrel 108 rotates be reduced, thereby preventing damage to the cam barrel gear 313 and reduction gear 312.

While the frictional force F2 is increased by designing the shape of the protrusion 723, it is possible to reduce the force F1 that rotates the cam barrel 108, and an example thereof will be described. FIG. 11B is a diagram showing an example in which the friction coefficient μ is increased by a shape of the protrusion 723. Here, the shape of the protrusion 723 at the contact portion P between the recess 713 and the protrusion 723 is a sharp shape such that the protrusion 723 bites into the recess 713. As a result, it is possible to increase the friction coefficient μ at the contact portion P to generate a larger frictional force F2 and at the same time reduce the force F1 that rotates the cam barrel 108. It should be noted that the method for increasing the friction coefficient μ can be realized not only by shape design but also by appropriately selecting materials of the recess 713 and the protrusion 723.

Increasing the frictional force F2 has an effect of suppressing the transmission of the impact force. In other words, as shown in FIGS. 8A and 8C, the portion of the recess 713 is inclined so that the inclined portion is not orthogonal to the optical axis Oa on the cross section passing through the optical axis Oa, and the inner circumference part of the portion of the recess 713 is closer to the distal end of the interchangeable lens 101 than the outer circumference part of the portion of the recess 713. Therefore, the impact force transmitted to the contact portion P is also converted into a force that pushes a cylindrical portion of the filter frame 711 in an outer circumferential direction. However, since the restriction wall 802 is provided at the outer circumference of the filter frame 711, the deformation of the filter frame 711 is restricted by the cylindrical face of the filter frame 711 coming into contact with the restriction wall 802. At this time, a frictional force is also generated between the filter frame 711 and the restriction wall 802, so that the impact force is absorbed. In this way, the interchangeable lens 101 can efficiently absorb the impact force applied to the filter frame 711.

Next, a configuration for suppressing the lengthening of the interchangeable lens 101 in the optical axis direction will be described. As shown in FIG. 8A, a distal end inner circumference of the filter frame 711 has a female thread portion 712. The female thread portion 712 is a filter fixing portion for screwing and holding various filters such as a protective filter that protects the first focus lens 211 from water droplets and dirt, a dimming filter, and a polarizing filter.

Further, as shown in FIG. 8A, a first cover member 731 as a component for hiding the stepped screw 721 from being exposed to the outside is attached to a distal end of the filter frame 711. In the interchangeable lens 101, an outermost diameter of the first cover member 731 is set to a value shorter than a radius of the female thread portion 712. As a result, the female thread portion 712 and the first cover member 731 can partially overlap in the optical axis direction. As a result, it is possible to prevent a thickness of the first cover member 731 from increasing the overall length of the interchangeable lens 101.

As described above, according to the present embodiment, it is possible to reduce the impact force transmitted to the inside of the interchangeable lens 101 without increasing the total length of the interchangeable lens 101.

Finally, further features of the interchangeable lens 101 will be described. As shown in FIGS. 8A and 8B, a second cover member 213 is provided at the distal end of the distal end lens barrel 210 to prevent water droplets and dust from entering the inside of the interchangeable lens 101 from the outside. The second cover member 213 has a cylindrical projection portion 213a and a light ray cutting portion 213b. The projection portion 213a projects toward the distal end (subject side) of the interchangeable lens 101, and its inner diameter is set to a value larger than an inner diameter of the first cover member 731. Therefore, when viewed from the optical axis direction, the projection portion 213a overlaps the first cover member 731. Further, as shown in FIGS. 8A and 8B, the projection portion 213a is provided so that part thereof overlaps the first cover member 731 in the optical axis direction. As a result, the projection portion 213a prevents water droplets, dust, and the like from entering the inside of the interchangeable lens 101 through the gap between the first cover member 731 and the focus group 201.

The light ray cutting portion 213b is provided radially inside the projection portion 213a, and determines an inner diameter of a light beam incident on the focus group 201. An inner diameter of the light ray cutting portion 213b is set to a value smaller than the inner diameter of the first cover member 731, so that it is possible to accurately cut unnecessary incident light by the light ray cutting portion 213b.

It should be noted that when the filter frame 711 receives an external force and the coil spring 722 is compressed, the filter frame 711 approaches the projection portion 213a. Here, in the interchangeable lens 101, as shown in FIG. 8B, a third gap SP3 is formed to be larger (wider) than the first gap SP1 in the optical axis direction between a distal end of the projection portion 213a and the filter frame 711. For this reason, even when the coil spring 722 is compressed by an external force, collision of the filter frame 711 with the projection portion 213a is prevented, and a position of the light ray cutting portion 213b with respect to the focus group 201 does not change.

It should be noted that in the above embodiment, in the optical apparatus according to the present invention, an interchangeable lens is described as an application, but the present invention can be applied to an optical apparatus such as a lens-integrated camera, a telescope, and binoculars.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-083401, filed May 11, 2020, which is hereby incorporated by reference herein in its entirety.

What is claimed is:

1. An optical apparatus comprising:
an extension lens barrel that moves forward and backward in an optical axis direction;
a cam follower provided in the extension lens barrel;
a cam barrel that has a cam groove which engages with the cam follower and a protrusion which is provided so as to protrude in an outer circumferential side and is rotatable around an optical axis;
a frame member that covers a distal end of the extension lens barrel and part of an outer circumference of the cam barrel and moves forward and backward in the optical axis direction integrally with the extension lens barrel;
an elastic member that urges the extension lens barrel and the frame member to be away from each other in the optical axis direction; and
a restriction member that holds the frame member with a first gap formed between the extension lens barrel and the frame member in the optical axis direction,
wherein a recess facing the protrusion in a radial direction is provided at an inner circumference of the frame member, and
a second gap formed between the protrusion and the recess in the optical axis direction is smaller than the first gap.

2. The optical apparatus according to claim 1, wherein the protrusion and the recess do not come into contact with each other in an entire region where the extension lens barrel moves forward and backward, and
when a force that pushes the frame member toward the extension lens barrel in the optical axis direction is applied to the frame member, the protrusion and the recess come into contact with each other before the frame member comes into contact with the extension lens barrel in the optical axis direction.

3. The optical apparatus according to claim 1, wherein a portion of the recess on a distal end side of the optical apparatus is inclined so that the portion is not orthogonal to the optical axis on a cross section including the optical axis, and an inner circumference part of the portion is closer to a distal end of the optical apparatus than an outer circumference part of the portion.

4. The optical apparatus according to claim 1, wherein the protrusion has a sharp shape at a contact portion with the recess.

5. The optical apparatus according to claim 2, wherein a frictional force generated at a contact portion when the protrusion and the recess come in contact with each other acts in a direction of suppressing rotation of the cam barrel.

6. The optical apparatus according to claim 1, further comprising:
an exterior member disposed at an outer circumference of the frame member,
wherein a restriction wall that restricts deformation of the frame member is provided at an inner circumference of the exterior member.

7. An image pickup apparatus comprising:
an optical apparatus; and
an image pickup device that converts an image of light passing through an extension lens barrel of the optical apparatus into an electrical signal,
wherein
the optical apparatus includes the extension lens barrel that moves forward and backward in an optical axis direction, a cam follower that is provided in the extension lens barrel and has a cam groove which engages with the cam follower and a protrusion which is provided so as to protrude in an outer circumferential side and is rotatable around an optical axis, a frame member that covers a distal end of the extension lens barrel and part of an outer circumference of the cam barrel, and moves forward and backward in the optical axis direction integrally with the extension lens barrel, an elastic member that urges the extension lens barrel and the frame member to be away from each other in the optical axis direction, and a restriction member that holds the frame member with a first gap formed between the extension lens barrel and the frame member in the optical axis direction,
a recess facing the protrusion in a radial direction is provided at an inner circumference of the frame member, and
a second gap formed between the protrusion and the recess in the optical axis direction is smaller than the first gap.

* * * * *